Feb. 10, 1942.  P. D. MERRILL  2,272,621
WELD PATCH CLAMP
Filed July 5, 1938
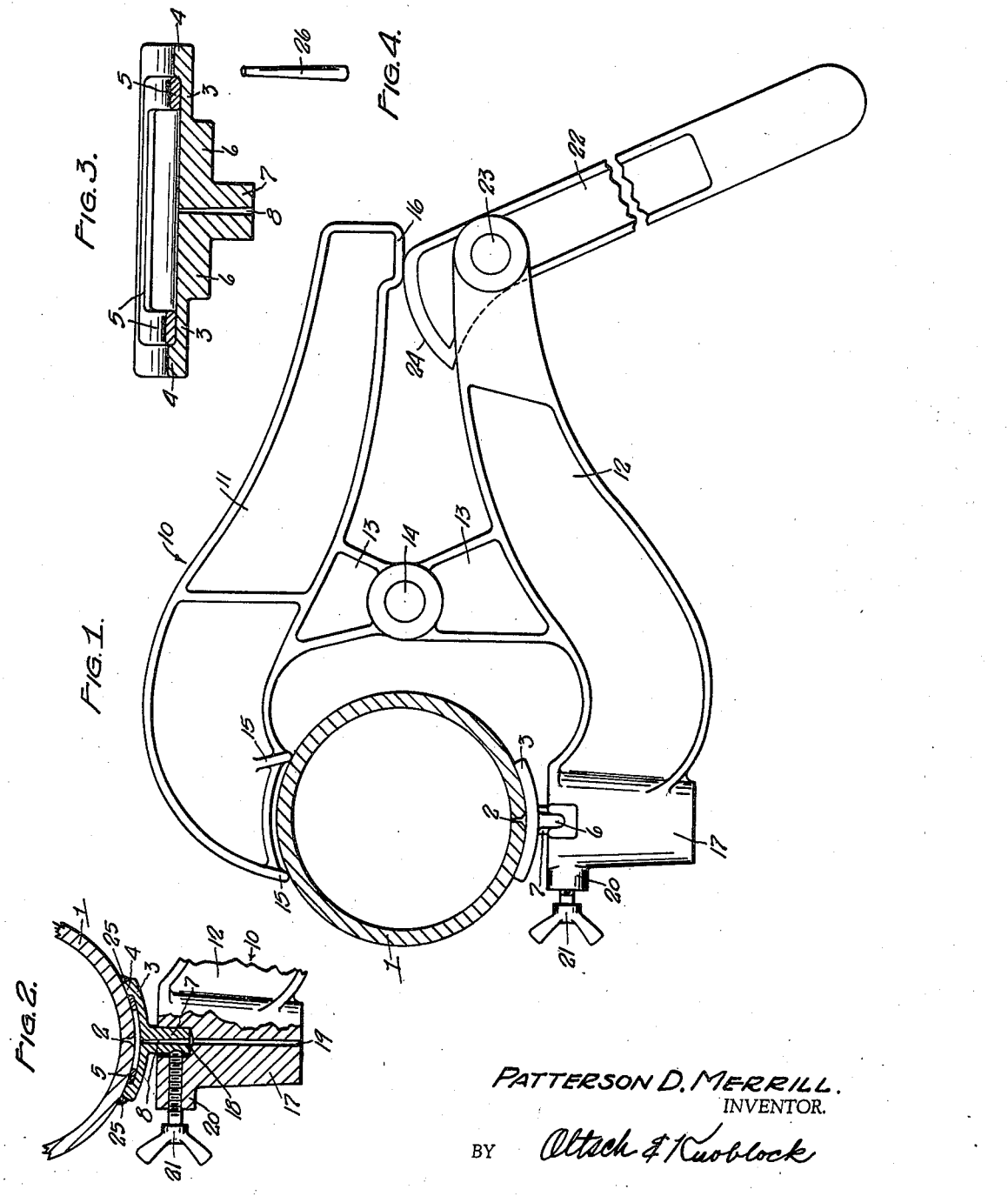
PATTERSON D. MERRILL.
INVENTOR.
BY Oltsch & Knoblock
ATTORNEYS.

Patented Feb. 10, 1942

2,272,621

UNITED STATES PATENT OFFICE 2,272,621

WELD PATCH CLAMP

Patterson D. Merrill, South Bend, Ind., assignor to M. B. Skinner Co., South Bend, Ind., a corporation of Indiana Application July 5, 1938, Serial No. 217,496

1 Claim. (Cl. 113—102)

This invention relates to weld patch clamps, and particularly to a clamp for use in applying a patch to a pipe containing fluid under high pressure, for the purpose of welding the patch to the pipe to seal a pipe leak.

A number of problems are encountered in the use of devices for this purpose. It is essential that the clamp for holding the patch preparatory to and during welding be so arranged in respect to the patch as to afford convenient access to the entire perimeter of the patch for welding. The leak on a pipe is likely to occur in any circumferential portion thereof, and a the clamp must be capable of convenient application in any position; and additionally must be susceptible of rapid operation in application to accurately seat the patch against the dislocating stress or force exerted against the patch by a jet of fluid escaping at high pressure from the leak. A further problem is presented by the necessity for effecting a seal between the patch and the pipe which will withstand the application of the heat of welding and which will not "blow out" when the welding of the patch has been partially completed. The last named problem is particularly difficult of solution, since the sealing qualities of most gasket materials which are sufficiently soft to form a seal with the irregular outer surface of a pipe are destroyed by heat, while gaskets of this type formed of material which will resist heat, such as asbestos, are not effective under high pressures. Thus it has been found that the use of most patch plates having gaskets soft enough for the purpose, and heat resisting, will form and hold a seal while the major perimetral portion of the patch plate is being welded to a pipe, but the sealing action of the gasket generally breaks just before the full weld is completed due to concentration of the force of escaping fluid at a restricted point, or due to other reasons not known, so that it becomes impossible to complete the weld with resultant inoperativeness of the patch and complication of the work of sealing the leak.

It is the primary object of this invention to provide means for meeting the aforesaid requirements and conditions, and for overcoming the inadequacies of prior devices in the above and other respects.

A further object is to provide a device of this character by which gas escaping from a pipe may be by-passed during welding, and the by-pass later sealed.

A further object is to provide a novel method for sealing a pipe leak.

A further object is to provide a device of this character having a weld patch provided with a by-pass which communicates with a passage in the clamp for exhausting leaking gas during the operation of welding the patch, said patch by-pass being adapted to receive a sealing member with a driving fit.

A further object is to provide a novel and convenient clamp for a weld patch.

A further object is to provide a novel interconnection between a weld patch and a clamp therefor.

A further object is to provide a device of this character wherein a patch plate is mounted on a clamp in a manner to accommodate itself to the exterior of a pipe.

Other objects will be apparent from the description and appended claim.

In the drawing:

Fig. 1 is a view of the device in side elevation and operatively applied to a pipe shown in cross section.

Fig. 2 is a fragmentary detail view similar to Fig. 1 with parts shown in section.

Fig. 3 is an enlarged longitudinal sectional view of a welding patch.

Fig. 4 is a perspective view of a tapered sealing pin.

Referring to the drawing, which illutrates the preferred embodiment of the invention, the numeral 1 designates a pipe, such as an oil or gas pipe subjected to high pressure, and having a leak 2 to be sealed.

A patch plate 3 is adapted to be perimetrally welded to pipe 1 to seal the leak and comprises a body portion bent to conform to the contour of the outer surface of the pipe. At its concave face, the plate 3 is provided with a marginal off-set portion 4 of increased thickness. A gasket 5 seats snugly on the concave face of plate 3, said gasket being of thickness slightly greater than the dimension of the off-set, and having a large opening in its center. At is convex face, plate 3 is provided with a central longitudinal rib 6 and with a central perpendicular plug portion 7, both of which are preferably formed integrally with the plate. A bore or by-pass 8 is formed centrally in plate 3 and extends substantially axially through plug portion 7, said bore preferably being of circular cross section and tapering from its outer to its inner end.

The patch 3 is adapted to be mounted by a clamp 10 comprising clamp parts 11 and 12 which are provided with lateral off-sets 13 intermediate their ends which are pivotally interconnected at 14. The clamp parts 11 and 12 are both of reverse curvature and are generally of complementary shape and contour with the jaw or head portions thereof curving inwardly. A pair of transversely extending ribs 15 are integrally formed with part 10, the bearing surfaces of said ribs being off-set from the inner surface of the head portion of part 10 to bear upon the exterior surface of a pipe in parallel relation to the pipe axis. At the opposite end of the part 10 is formed an inwardly off-set bearing portion 16.

A head 17 is formed integrally with part 12 at the jaw portion thereof, said head having a groove in the center of its inner face extending parallel to the axis of pipe 1. A bore 18 extending axially of head 17 at its inner portion and for a restricted depth, serves with said groove to form a seat for the rib and projection of the patch plate. A bore 19 of reduced diameter communicates with bore 18, and extends to the outer end of head 17. A projection 20 extends outwardly of head 17 and a set screw 21 extends therethrough and through the head to the seat 18.

The opposite end of clamp part 12 has a lever 22 pivoted thereto at 23, said lever being provided with a cam end 24 adapted to ride on bearing portion 16 of clamp part 11.

The operation of the device is as follows: a patch plate 3 is mounted on the head 17 of clamp part 12 by seating ribs 6 thereof in the grooves therefor in said head and by seating plug 7 in the socket or seat 18 therefor in said head. Set screw 21 is then tightened to bear against plug 7 and hold the parts against separation. The parts fit loosely to accommodate a limited amount of tilting of patch plate 3 on head 17.

The clamp is then applied to the pipe with the ribs 15 of part 11 bearing on the pipe and plate 3 held in spaced relation adjacent the pipe leak 2. Handle 22 is then operated to quickly draw the clamp tight upon the pipe, with gasket 5 forming a seal adjacent the perimeter of the plate 3, and the fluid escaping from the pipe at 2 exhausting to atmosphere through communicating bores 8 and 19 in the plate and clamp head 17, respectively. It will be seen that the provision for escape of the leaking fluid minimizes the displacing action of the escaping fluid against the patch plate 3 during application, and permits provision of a partial purchase or engagement of plate 3 with the pipe to be followed by hammering or like forcing of the handle 22 to complete the perimetral seal between plate 3 and the pipe.

When the clamp has been firmly applied, the plate 3 may be welded to the pipe about its complete perimeter, as at 25 in Fig. 2. It will be seen that the mounting of the plate on its stud 7 permits spacing thereof from the clamp sufficient for convenient access to all edges of the plate for welding. Likewise the exhaust of leaking gas prevents the building up of pressure between the plate and the pipe to an extent that the gasket is blown out at any point before the complete perimetral weld is completed.

After the plate 3 has been welded to the pipe, the clamp 10 is disconnected and removed. A suitable wedge driving pin 26 is then driven into the bore 8 of the patch and completes the seal. While the driving fit of the pin in the bore is usually sufficient to effect a positive and permanent seal, the same may be welded to the patch if desired.

It will thus be seen that the device is simple in construction, is convenient for use without regard to the circumferential location of the leak in a pipe, is capable of use with pipes under high pressure without undue danger or difficulty, and assures obtaining of a positive seal.

I claim:

A clamp comprising a pair of pivotally interconnected jaws, means for pivoting said jaws toward each other, a pair of spaced transverse ribs forming inwardly projecting pipe-engaging bearings on one jaw, and means for tiltably and removably mounting a patch plate to project inwardly from the other jaw at a point spaced from the pivot axis of said member a distance intermediate that of said ribs from said axis.

PATTERSON D. MERRILL.